US012352177B2

United States Patent
Lee et al.

(10) Patent No.: US 12,352,177 B2
(45) Date of Patent: Jul. 8, 2025

(54) UNBALANCED ROTOR FOR UNBALANCE TESTING OF AIRCRAFT POWER PLANT

(71) Applicant: PRATT & WHITNEY CANADA CORP., Longueuil (CA)

(72) Inventors: Jeff Lee, Burlington (CA); Vinod Para, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/523,100

(22) Filed: Nov. 29, 2023

(65) Prior Publication Data

US 2025/0172072 A1    May 29, 2025

(51) Int. Cl.
  *F01D 21/00*    (2006.01)
  *F01D 5/18*    (2006.01)

(52) U.S. Cl.
  CPC ............. *F01D 21/003* (2013.01); *F01D 5/18* (2013.01); *F05D 2220/36* (2013.01); *F05D 2260/83* (2013.01)

(58) Field of Classification Search
  CPC .......... F01D 5/18; F01D 21/003; F01D 5/027; F01D 5/26; F01D 5/04; F05D 2220/36; F05D 2260/83; F05D 2260/15; F05D 2260/96
  See application file for complete search history.

(56) References Cited

U.S. PATENT DOCUMENTS

| | | | |
|---|---|---|---|
| 7,303,377 B2 * | 12/2007 | Rockarts | F02K 3/04 416/144 |
| 2005/0149234 A1 | 7/2005 | Vian | |
| 2005/0231052 A1 * | 10/2005 | Rockarts | F16F 15/34 310/90 |
| 2006/0251507 A1 | 11/2006 | Braswell | |
| 2007/0231103 A1 * | 10/2007 | Evans | F16C 3/20 411/102 |

(Continued)

FOREIGN PATENT DOCUMENTS

| FR | 3044701 A | 3/1969 |
|---|---|---|
| FR | 21022005 A1 | 4/2021 |

OTHER PUBLICATIONS

European Patent Office, Communication re. extended European search report for European patent application No. 24216303.8, May 14, 2025.

*Primary Examiner* — David E Sosnowski
*Assistant Examiner* — Aye S Htay
(74) *Attorney, Agent, or Firm* — Norton Rose Fulbright Canada LLP

(57) ABSTRACT

An unbalanced rotor is provided to perform unbalance testing on an aircraft power plant. The unbalanced rotor includes a hollow body rotatable about a rotation axis and an unbalancing weight installed inside of the hollow body. The unbalancing weight is installed inside of the hollow body to intentionally vibrate the rotor during rotation of the rotor. The unbalancing weight is fastened to the hollow body via one or more fasteners. A portion of the unbalancing weight is disposed radially inwardly of a retainer of the hollow body and is engaged with the retainer to define a radial load path between the unbalancing weight and the hollow body via the retainer. The radial load path excludes the one or more fasteners.

20 Claims, 11 Drawing Sheets

(56) References Cited

U.S. PATENT DOCUMENTS

| | | | |
|---|---|---|---|
| 2013/0011253 A1* | 1/2013 | Mulcaire | F01D 25/265 415/214.1 |
| 2013/0236310 A1 | 9/2013 | Billings | |
| 2017/0108009 A1 | 4/2017 | Obereich | |
| 2022/0333503 A1 | 10/2022 | Maddaleno | |

* cited by examiner

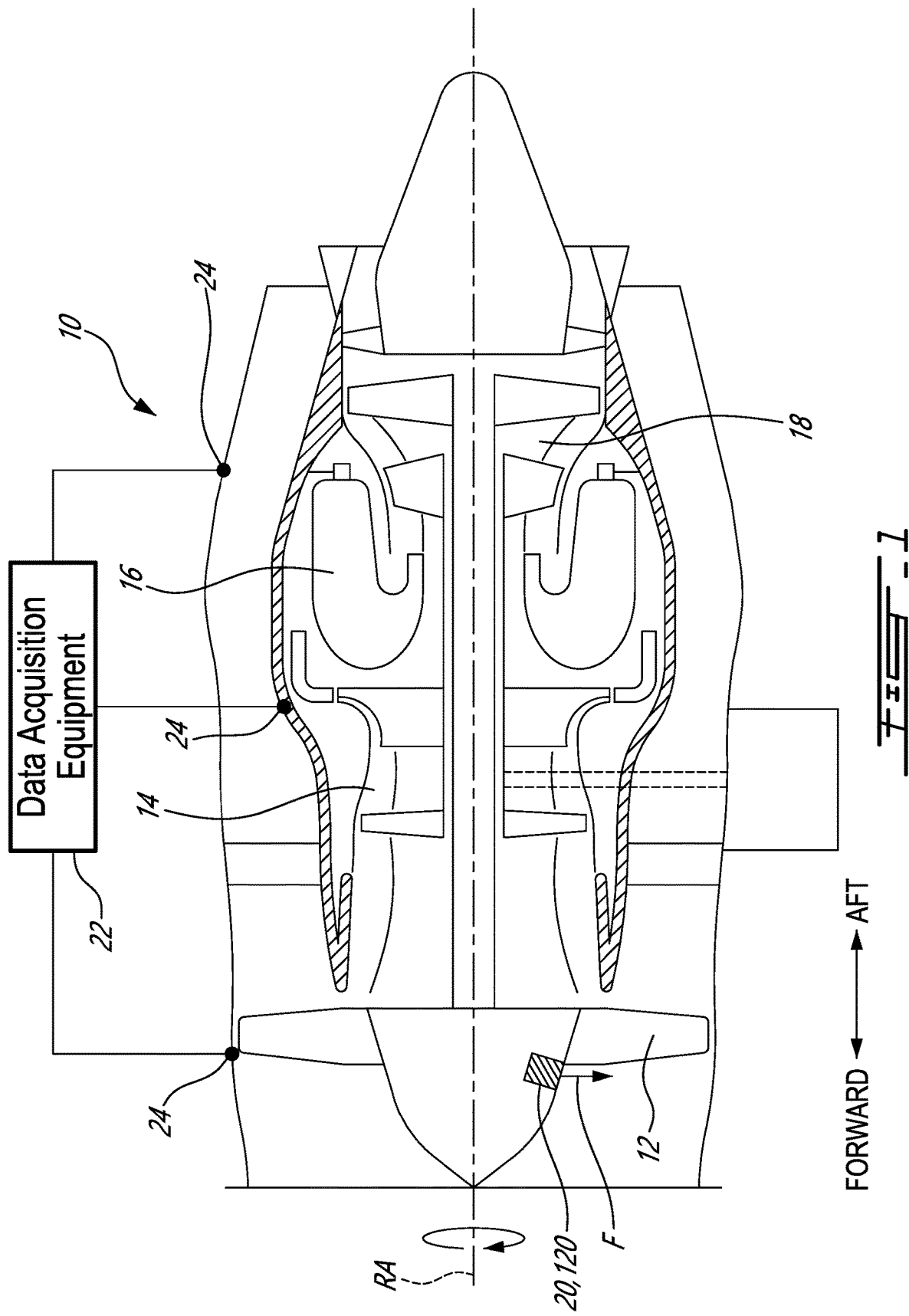

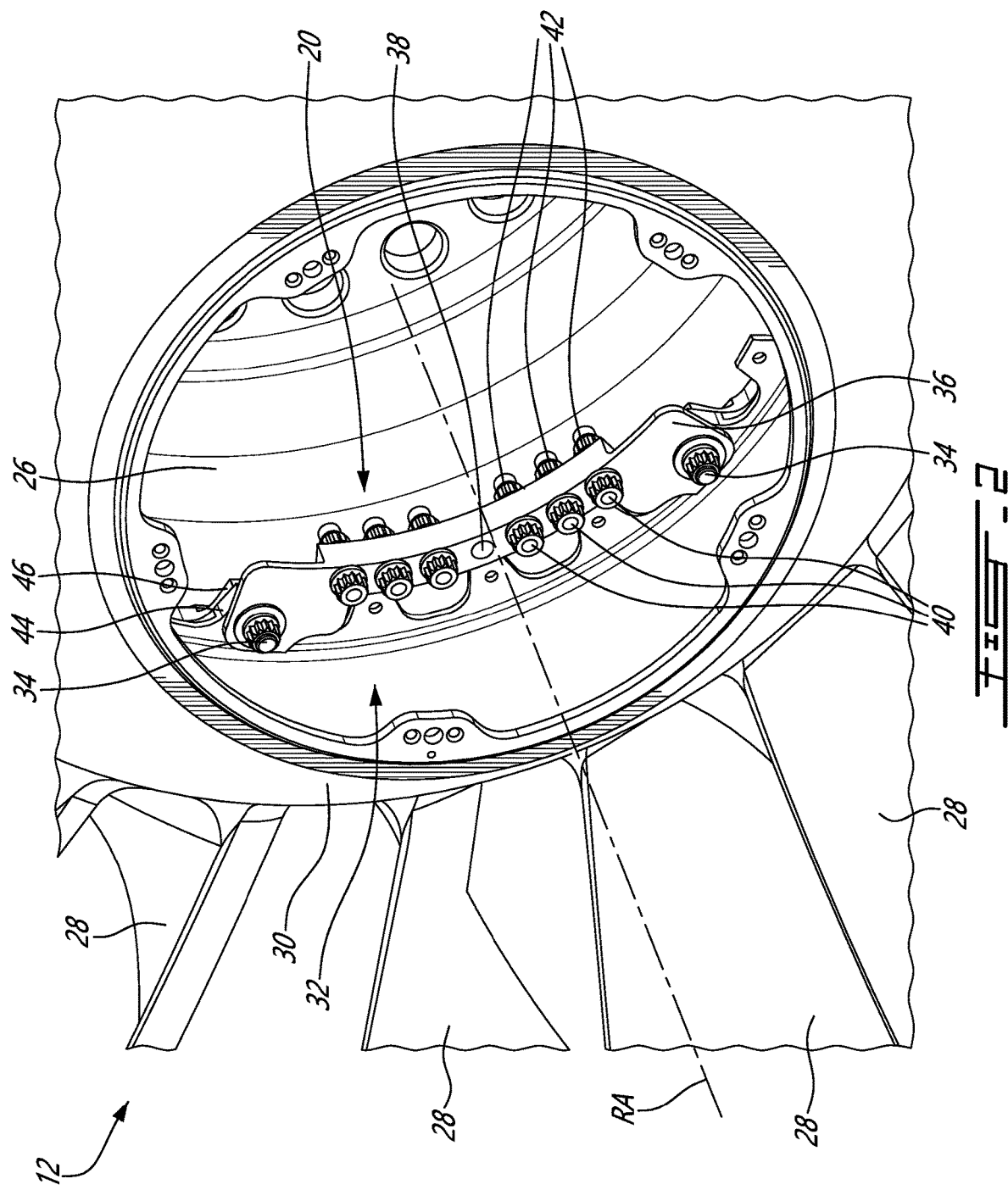

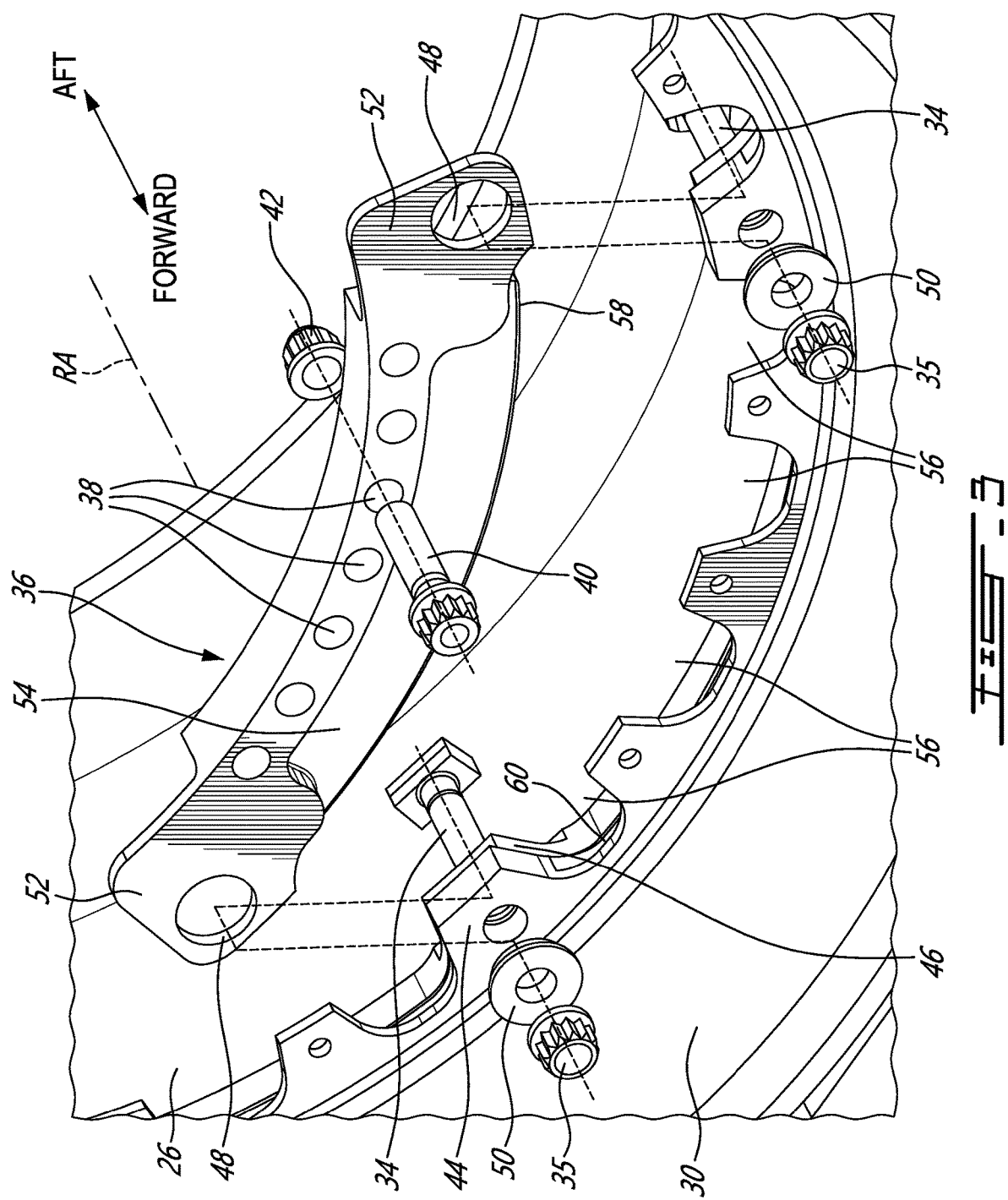

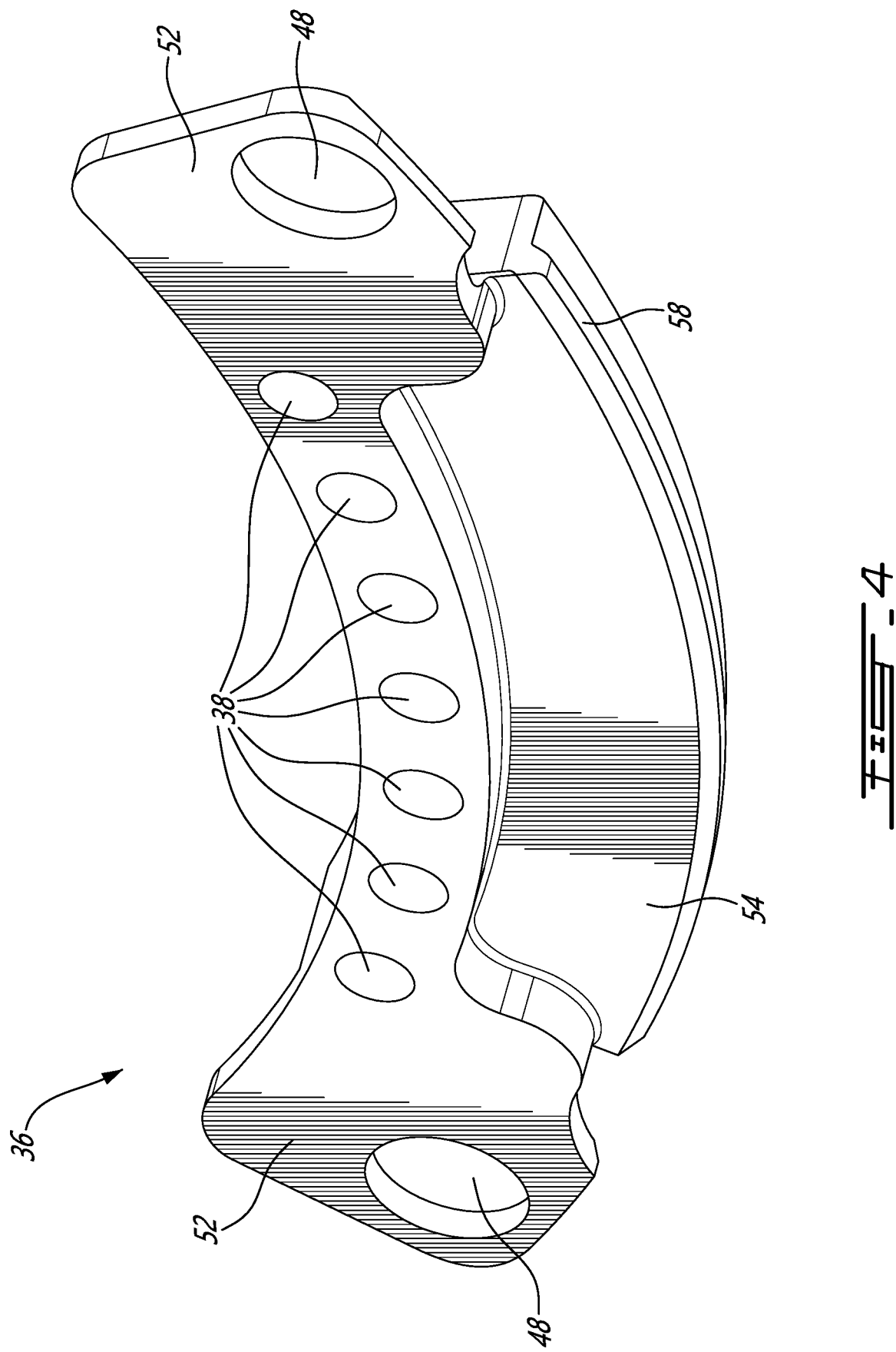

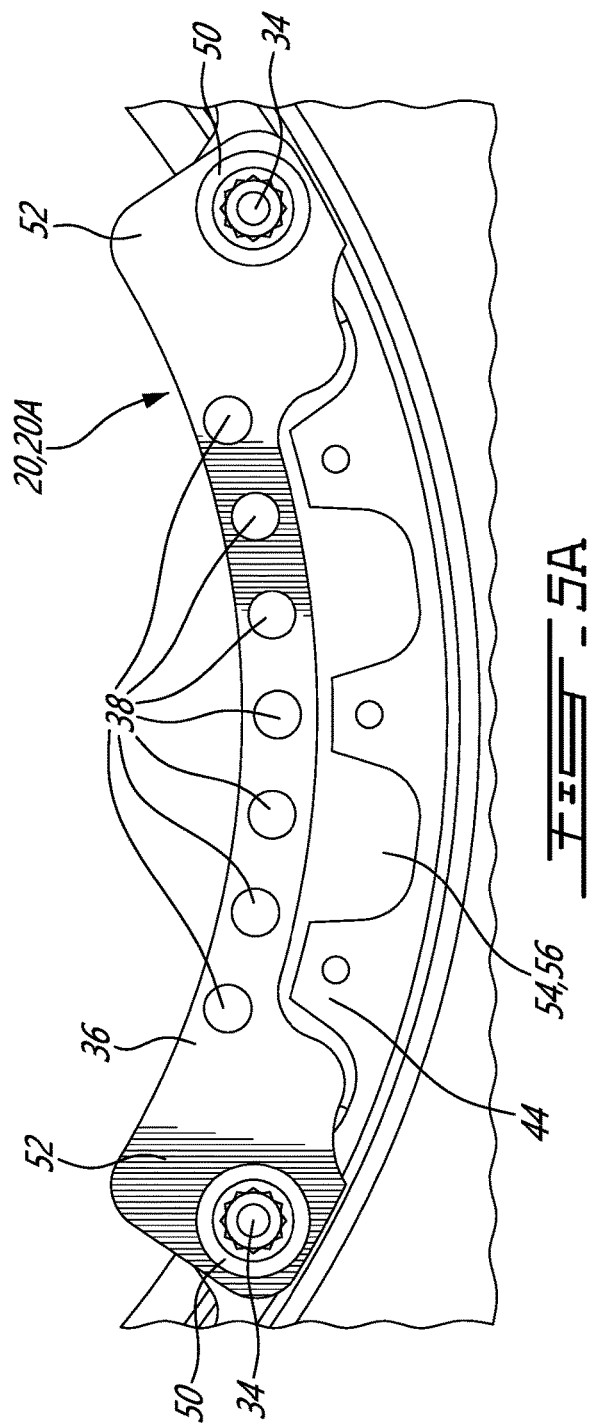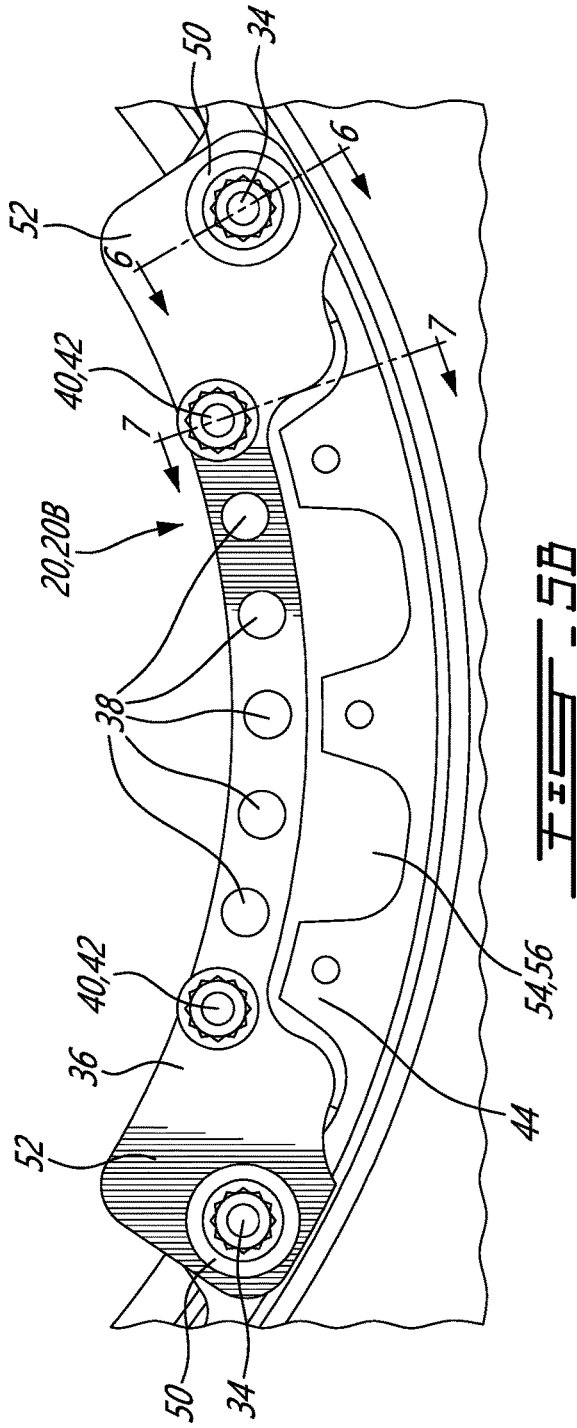

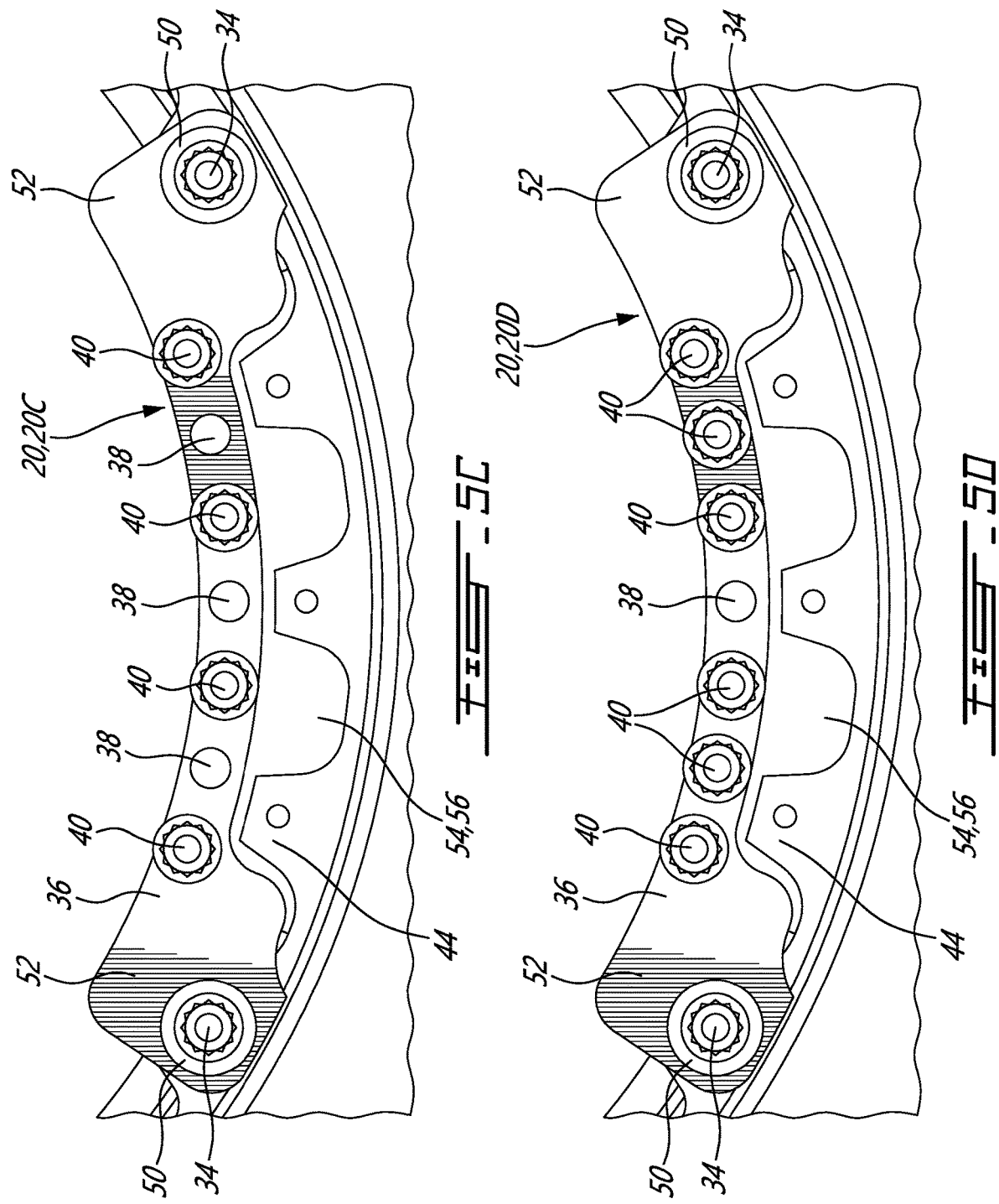

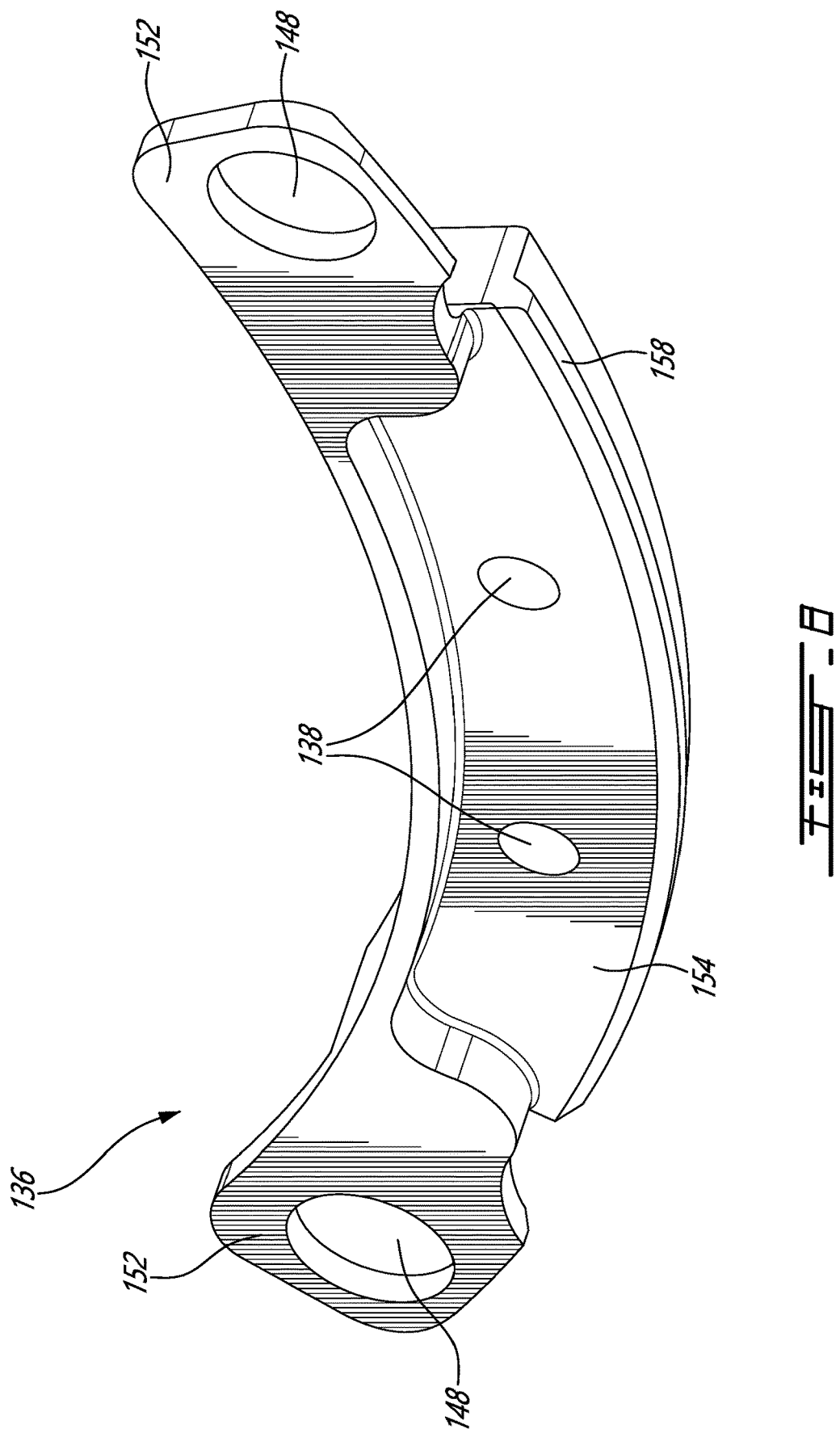

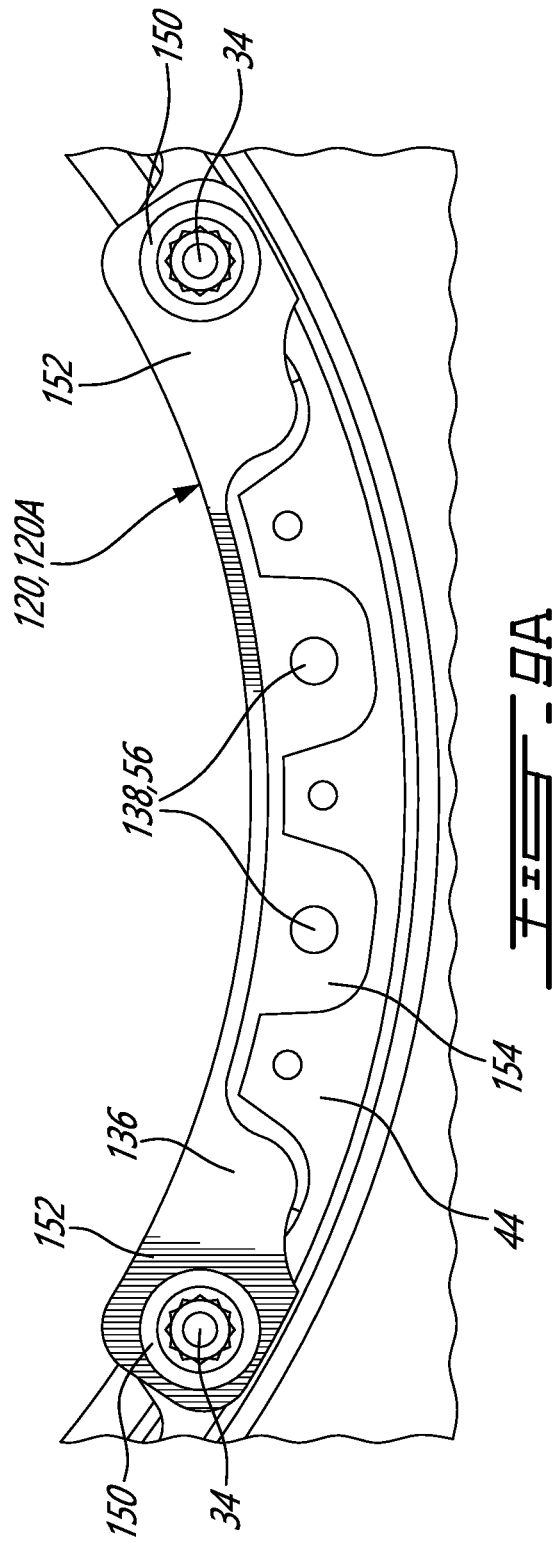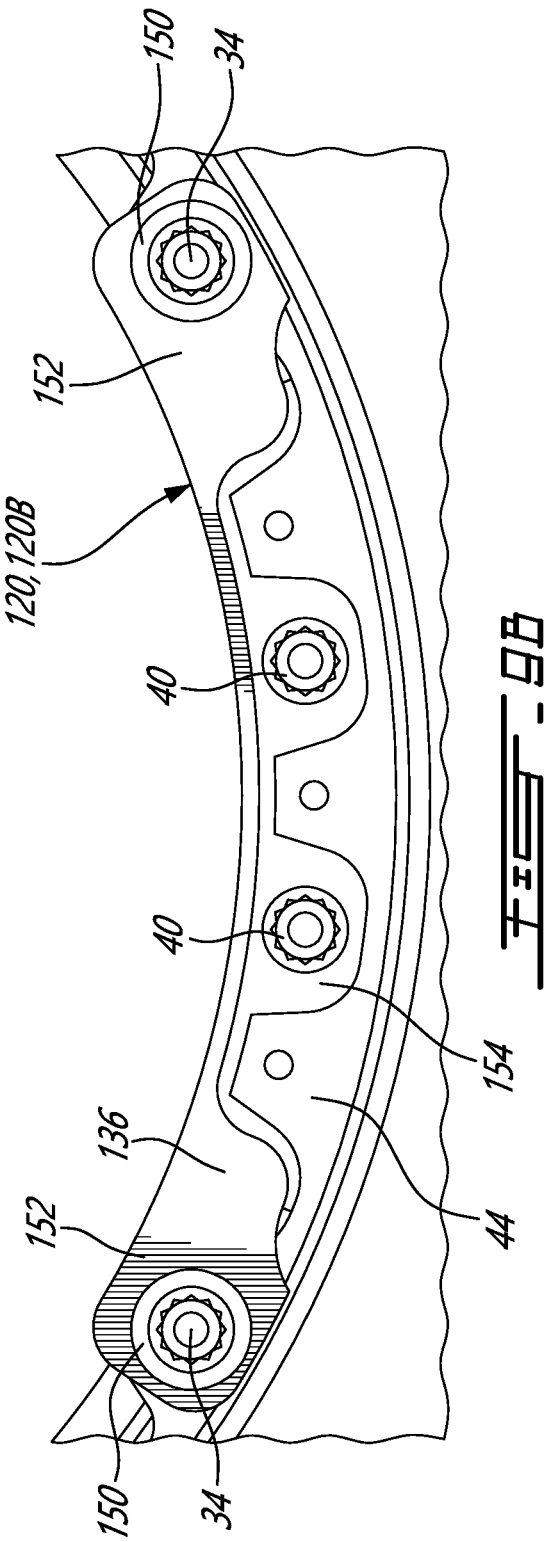

UNBALANCED ROTOR FOR UNBALANCE TESTING OF AIRCRAFT POWER PLANT

TECHNICAL FIELD

The disclosure relates generally to aircraft power plants, and more particularly to testing of aircraft power plants.

BACKGROUND

Rotor balancing is used to achieve a relatively even mass distribution of the rotor around a rotation axis of the rotor so that bearing forces and vibrations associated with the rotor may be within acceptable limits. It may be desirable to evaluate the behaviour of the engine under an unbalance condition. However, existing devices used for balancing are not suitable for unbalance testing. Improvement is desirable.

SUMMARY

In one aspect, the disclosure describes an unbalanced rotor of an aircraft power plant. The unbalanced rotor comprises:
a hollow body rotatable about a rotation axis, an interior of the hollow body including a retainer; and
an unbalancing weight installed inside of the hollow body to intentionally vibrate the rotor during rotation of the rotor, the unbalancing weight being fastened to the hollow body via one or more fasteners, a portion of the unbalancing weight being disposed radially inwardly of the retainer of the hollow body and being engaged with the retainer to define a radial load path between the unbalancing weight and the hollow body via the retainer, the radial load path excluding the one or more fasteners.

The hollow body may include a hub and a nose cone fastened to the hub. The unbalanced rotor may include a plurality of blades extending radially outwardly from the hub. The one or more fasteners may secure the nose cone to the hub.

Wherein the retainer may be part of the nose cone.

The hub may be devoid of the retainer.

The unbalancing weight may include one or more holes receiving the one or more fasteners respectively therethrough. The one or more fasteners may extend through a flange of the hub and a flange of the nose cone. The one or more fasteners may secure the flange of the hub with the flange of the nose cone together.

The nose cone may be disposed axially forward of the hub. The unbalancing weight may include: a forward wall disposed axially forward of the flange of the nose cone; and an aft wall connected to the forward wall and disposed axially aft of the flange of the nose cone.

The forward wall and the aft wall of the unbalancing weight may be connected together via a cutout through the flange of the nose cone.

The unbalanced rotor may comprise one or more sleeves disposed inside the one or more holes respectively. The one or more fasteners may extend through the one or more sleeves respectively. The one or more holes in the unbalancing weight and the one or more sleeves may be sized to define clearances between the one or more sleeves and the one or more holes respectively.

The unbalancing weight may include: one or more first holes receiving the one or more fasteners respectively therethrough; and one or more second holes for mounting additional weight to the unbalancing weight.

The additional weight may include one or more bolts extending through the one or more second holes respectively.

The unbalancing weight may have an angular span around the rotation axis. The one or more first holes may include two angularly spaced apart first holes. The one or more second holes may be angularly disposed between the two angularly spaced apart first holes.

The radial load path may include an interface between the portion of the unbalancing weight and the retainer. The interface may span at least a majority of an angular span of the unbalancing weight around the rotation axis.

A gasket may be disposed between the unbalancing weight and the hollow body.

Embodiments may include combinations of the above features.

In another aspect, the disclosure describes an aircraft power plant comprising:
a bladed rotor including a hub, the bladed rotor being rotatable about a rotation axis;
a nose cone fastened to the hub of the bladed rotor, the nose cone and the hub cooperatively defining an internal cavity; and
an unbalancing weight installed inside the internal cavity to intentionally vibrate the bladed rotor during rotation of the bladed rotor, the unbalancing weight including:
a carrier engaged with a radially inner surface of the nose cone so that the radially inner surface of the nose cone prevents radially outer movement of the carrier during rotation of the bladed rotor; and
one or more additional weights mounted to the carrier.

A radial load path may be defined between the carrier and the nose cone via the radially inner surface of the nose cone. The radial load path may be devoid of any fasteners.

The unbalancing weight may be installed inside the internal cavity via one or more fasteners extending through the carrier. A radial clearance may be defined between the one or more fasteners and the carrier to permit radial positional adjustment of the carrier relative to the one or more fasteners.

A flange of the hub may be fastened to a flange of the nose cone. The carrier may include: a forward wall disposed axially forward of the flange of the nose cone; and an aft wall disposed axially aft of the flange of the nose cone. The forward wall and the aft wall may be connected together via a cutout through the flange of the nose cone.

Embodiments may include combinations of the above features.

In a further aspect, the disclosure describes a method of performing an unbalance test on an aircraft power plant. The method comprises:
receiving an aircraft power plant having a rotor with a first balance state;
installing an unbalancing weight on the rotor to intentionally cause the rotor to have a second balance state that is more unbalanced than the first balance state of the rotor;
rotating the rotor to intentionally vibrate the rotor using the unbalancing weight;
while the rotor is being rotated:
radially supporting the unbalancing weight using a retainer of the rotor, the retainer being disposed radially outwardly of a portion of the unbalancing weight and being engaged with the portion of the unbalancing weight; and
monitoring the aircraft power plant.

The unbalancing weight may be installed on the rotor using one or more fasteners. The retainer may exclude the one or more fasteners. The method may include supporting at least a majority of a radially outward load imposed by the unbalancing weight using the retainer.

The aircraft power plant may be a turbofan gas turbine engine. The rotor may be a fan of the turbofan gas turbine engine. The fan may include: a plurality of blades extending radially outwardly from a hub; and a nose cone fastened to a forward side of the hub. The retainer may be part of the nose cone.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 shows a schematic axial cross-sectional view of an exemplary aircraft power plant including an unbalanced rotor as described herein;

FIG. 2 is a partial perspective view of an exemplary unbalanced rotor of the aircraft power plant of FIG. 1 including an unbalancing weight installed on the unbalanced rotor;

FIG. 3 is an exploded view of part of the unbalanced rotor of FIG. 2 illustrating an installation of the unbalancing weight on the unbalanced rotor;

FIG. 4 is a perspective view of an exemplary carrier of the unbalancing weight shown in isolation;

FIGS. 5A-5D are axial end-on views of the unbalancing weight including the carrier of FIG. 4 installed on the unbalanced rotor showing different exemplary configurations of the unbalancing weight providing different masses for unbalancing the unbalanced rotor;

FIG. 8 is a perspective view of another exemplary carrier of another unbalancing weight shown in isolation;

FIGS. 9A and 9B are axial end-on views of the unbalancing weight including the carrier of FIG. 8 installed on the unbalanced rotor showing different exemplary configurations of the unbalancing weight providing different masses for unbalancing the unbalanced rotor.

DETAILED DESCRIPTION

Figure 6:
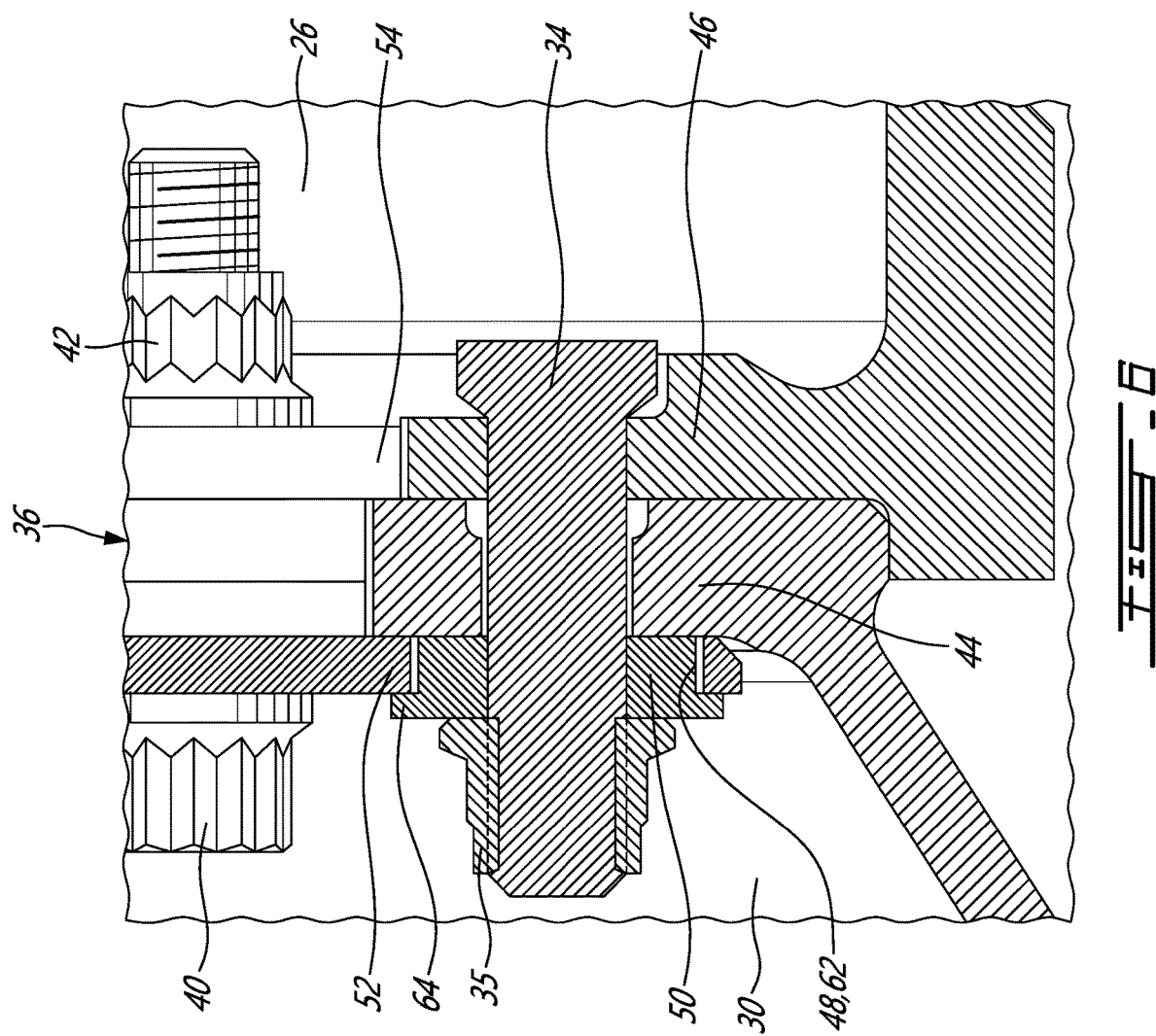
FIG. 6 is a cross-sectional view of the unbalanced rotor taken along line 6-6 in FIG. 5B.

The present disclosure describes unbalancing weights for installation on rotors of aircraft power plants, unbalanced (e.g., bladed) rotors, aircraft power plants including unbalanced rotors, and methods of performing unbalance testing on aircraft power plants. During testing of an aircraft power plant, it may be desirable to evaluate the behaviour of the power plant under a rotor unbalance condition caused by a damaged rotor (e.g., blade off event) of the power plant for example. In order to simulate such unbalance condition for testing purposes, an unbalancing weight is mounted to the rotor to intentionally cause a rotating unbalance and vibrate the rotor during rotation of the rotor. The rotating unbalance may be induced by an uneven distribution of mass around the axis of rotation of the rotor. The rotor is considered to be out of balance when its center of mass (inertia axis) is out of alignment with (i.e., is offset from) the rotation axis. The unbalance causes a moment which gives the rotor a wobbling movement which consequently causes vibration of the rotor and potentially also causes vibration of other components of the aircraft power plant.

Unbalancing weights described herein are used to intentionally induce an unbalance condition and may be larger and heavier than typical balancing weights used to balance rotors of aircraft engines. Accordingly, hardware (e.g., devices) that are used to secure balancing weights to rotors may not be suitable for securing the heavier unbalancing weights to such rotors. In some embodiments, the unbalanced rotors described herein make use of non-invasive techniques to secure unbalancing weights to rotors without the need for making hardware modifications to the rotor. In some embodiments, an unbalancing weight may be installed using existing fasteners of the rotor in a "floating" manner to permit positional adjustment and be radially supported by a surface of the rotor so that the centrifugal force associated with the unbalancing weight may be transferred directly to the surface of the rotor without applying significant additional load to the existing fasteners.

Aspects of various embodiments are described through reference to the drawings.

The terms "connected" or "engaged" may include both direct connection or engagement where two elements contact each other, and indirect connection or engagement where at least one additional element is located between the two elements. The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

FIG. 1 shows a schematic axial cross-sectional view of an exemplary aircraft power plant 10. In some embodiments, power plant 10 may be a turbofan gas turbine engine suitable for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. In other embodiments, power plant 10 may, for example, be a (e.g., turboprop or turboshaft) gas turbine engine, a piston engine, a rotary (e.g., Wankel) engine, a hybrid power plant including a combustion engine and an electric motor, or a fully electric power plant. Forward and aft directions are indicated on FIG. 1. The forward direction represents the typical travel direction of power plant 10 when power plant 10 is mounted to an aircraft and is propelling the aircraft. The aft direction is indicated as being opposite to the forward direction.

Power plant 10 may include one or more unbalanced rotors for the purpose of performing an unbalance test. In some embodiments, the unbalanced rotor may be an unbalanced bladed rotor such as fan 12 of a turbofan gas turbine engine for example. In some embodiments, the unbalanced rotor may be another type of bladed rotor such as a compressor disk or a turbine disk of a gas turbine engine for example. In some embodiments, the unbalanced rotor may be an air mover (e.g., fan, propeller) driven by a gas turbine engine or by an electric motor for example.

In the configuration shown in FIG. 1, fan 12 may be rotatable about rotation axis RA. Fan 12 may intentionally have an unbalanced state due to unbalancing weight 20 being installed on fan 12. Unbalancing weight 20 may be installed at a radial offset from rotation axis RA to intentionally cause the center of mass of fan 12 to be out of alignment with rotation axis RA. During rotation of fan 12 about rotation axis RA, unbalancing weight 20 may induce an imbalance in the form of centrifugal force F rotating about rotation axis RA to cause a wobbling movement of fan 12 and potentially cause vibration of other components of power plant 10 as well.

During unbalance testing, power plant 10 may be located in a suitable test cell instead of being installed on an aircraft. In other words, unbalance testing may be performed "off-wing". During unbalance testing, one or more portions of power plant 10 may be monitored while fan 12 is being rotated to induce the vibration. In some embodiments, a visual inspection of power plant 10 may be performed by maintenance personnel before, during and/or after the unbalance testing to assess the effect of the induced vibration on power plant 10. Instead or in addition, monitoring of power plant 10 may be performed using suitable data acquisition equipment 22 and one or more (e.g., vibration) sensors 24 such as accelerometers for example. Data acquisition equipment 22 may be configured to measure one or more electrical or physical phenomena, such as displacement (i.e., vibration), voltage, current, temperature, pressure, or sound. Data acquisition equipment 22 may include a computer with programmable software and operatively connected to sensor(s) 24. In some embodiments, data acquisition equipment 22 may include signal conditioning circuitry and analog-to-digital converters for example. Sensor(s) 24 may be used to sense one or more parameters of one or more components of power plant 10 during rotation of fan 12.

FIG. 2 is a partial perspective view of fan 12 as an exemplary unbalanced rotor of power plant 10. Fan 12 may include unbalancing weight 20 installed thereon to intentionally vibrate fan 12 during rotation of fan 12 about rotation axis RA. Unbalancing weight 20 may be installed to have a radial offset from radial axis RA. Unbalancing weight 20 may be the only (i.e. sole) unbalancing weight 20 that is installed on fan 12 so that no other (e.g., second) unbalancing weight is installed to counterbalance unbalancing weight 20. Accordingly, the sole unbalancing weight 20 may intentionally cause fan 12 to be unbalanced. In some embodiments, fan 12 may be substantially balanced prior to the installation of unbalancing weight 20 and may include one or more balancing weights previously installed to balance fan 12. Alternatively, one or more balancing weights previously installed to balance fan 12 may be removed from fan 12 prior to installation of unbalancing weight 20. In some embodiments, fan 12 may have an initial first balance state (e.g., substantially balanced) prior to installation of unbalancing weight 20, and may have a subsequent second balance state after the installation of unbalancing weight 20. The second balance state of fan 12 may intentionally be more unbalanced than the first balance state of fan 12.

Fan 12 may include hub 26 and a plurality of blades 28 attached to or integrally formed with hub 26 and extending radially outwardly from hub 26. An aft mounting interface of hub 26 may be fastened to a shaft of power plant 10 so that fan 12 may be in torque-transmitting engagement with and driven by a turbine of power plant 10 for example. Fan 12 may also include nose cone 30 fastened to a forward side (e.g., mounting interface) of hub 26. In other words, nose cone 30 may be disposed axially forward of hub 26, and hub 26 may be disposed axially aft of nose cone 30. In various embodiments, nose cone 30 may be a single monolithic component or may have a multi-piece construction. FIG. 2 shows a tip of nose cone 30 being removed to show internal cavity 32 formed by hub 26 and nose cone 30. For example, hub 26 and nose cone 30 assembled together may cooperatively define a multi-piece hollow body defining internal cavity 32.

Nose cone 30 may be secured to hub 26 with one or more fasteners 34 extending through flange 44 of nose cone 30 and flange 46 of hub 26 that extend radially inwardly and that are being held together via fasteners 34. Unbalancing weight 20 may be installed inside internal cavity 32 define by the hollow body to intentionally vibrate fan 12 and optionally vibrate other components of power plant 10 during rotation of fan 12. Unbalancing weight 20 may be fastened to hub 26 and/or to nose cone 30 via one or more fasteners 34. As explained below, unbalancing weight 20 may be fastened using fasteners 34 in a "floating" manner to avoid applying significant additional load to fasteners 34. For example, a radial load path between unbalancing weight 20 and hub 26 and/or nose cone 30 may exclude fasteners 34 so that some, a majority of or substantially all of centrifugal force F induced by unbalancing weight 20 may be transferred to hub 26 and/or to nose cone 30 without being transferred through fasteners 34.

Unbalancing weight 20 may be significantly heavier than a typical balancing weight that may me used to balance the same fan 12. Accordingly, hardware typically used to mount balancing weights to rotors may not be suitable for mounting unbalancing weight 20. For example, in some embodiments, unbalancing weight 20 may be two or more times heavier than a typical balancing weight used to balance the same fan 12. In some embodiments, unbalancing weight 20 may three or more times heavier than a typical balancing weight used to balance the same fan 12. For example, unbalancing weight 20 may be between 320% and 610% heavier than a typical balancing weight used to balance the same fan 12. In various embodiments, unbalancing weight 20 may have a mass of 100 grams or greater. In some embodiments, unbalancing weight 20 may have a mass between 100 grams and 300 grams. In some embodiments, unbalancing weight 20 may have a mass between 140 grams and 280 grams. The mass selected for unbalancing weight 20 may depend on the specific unbalance requirements.

Unbalancing weight 20 may include carrier 36 (holder) and optionally one or more additional weights mounted thereto. Carrier 36 may be fastened to hub 26 and/or nose cone 30 via one or more fasteners 34. Carrier 36 may serve as a base for selectively installing one or more additional weights onto fan 12 depending on the mass of unbalancing weight 20 that is desired for the unbalance test. In some situations carrier 36 alone may have sufficient mass for the unbalance test. In some situations, one or more additional weights may be added to carrier 36 to selectively vary the amount of mass of unbalancing weight 20. Carrier 36 may have one or more blind or through second holes 38 (first holes 48 being shown in FIG. 3) formed therein, which may be used to mount one or more additional weights to carrier 36. In some embodiments, the additional weight may include one or more fasteners (e.g., threaded bolts and/or screws) engaged with respective second holes 38. In some embodiments, the additional weights may include one or more bolts 40 and one or more corresponding nuts 42. In some situations, depending on the amount of mass required in unbalancing weight 20, some second holes 38 may be left empty and some second holes 38 may be occupied by respective bolts 40. In some situations, all second holes 38 may be left empty and no bolts 40 or nuts 42 may be required. In some situations, all second holes 38 may be occupied by respective bolts 40.

FIG. 3 is an exploded view of part of fan 12 illustrating an installation of unbalancing weight 20 on fan 12. Nose cone 30 may be secured to hub 26 with one or more fasteners 34 extending through respective holes formed through flange 44 of nose cone 30 and flange 46 of hub 26. Fasteners 34 may be threaded bolts engaged with corresponding nuts 35. In some embodiments, fasteners 34 may be of a type known as "T-bolts". Flange 44 of nose cone 30 and flange 46 of hub 26 may extend radially inwardly and may be secured (e.g., fastened) together via fasteners 34 located inside internal cavity 32 defined by hub 26 and nose cone 30.

Carrier 36 of unbalancing weight 20 may include one or more first holes 48 receiving one or more fasteners 34 respectively therethrough. One or more second holes 38 may be used to mount additional weight(s) such as one or more bolts 40 to carrier 36. In some embodiments, bolt(s) 40 may extend through second holes 38 and be secured to carrier 36 via nuts 42 engaged with respective bolts 40. Carrier 36 of unbalancing weight 20 may have an angular span around rotation axis RA. In some embodiments, the one or more first holes 48 may include two angularly spaced apart first holes 48. The one or more second holes 38 may be angularly disposed between the two first holes 48 relative to rotation axis RA.

In some embodiments, one or more (e.g., metallic) sleeves 50 (e.g., bushings) may be disposed inside the one or more first holes 48 respectively when carrier 36 is fastened to nose cone 30 and/or to hub 26. The one or more fasteners 34 may extend through the one or more sleeves 50 respectively.

In some embodiments, carrier 36 may be configured to cradle part of the interface between nose cone 30 and hub 26. For example, carrier 36 may include one or more forward walls 52 disposed axially forward of flange 44 of nose cone 30, and one or more aft walls 54 (referred hereinafter in the singular) connected to forward wall 52 and disposed axially aft of flange 44 of nose cone 30. In some embodiments, aft wall 54 or part(s) thereof may be disposed axially aft of flange 46 of hub 26. In some embodiments, the cradling of flange(s) 44 and/or 46 by carrier 36 may constrain axial movement of carrier 36 relative to nose cone 30 and hub 26.

In some embodiments, flange(s) 44 and/or 46 may include one or more cutouts 56 formed axially therethrough. In some embodiments, carrier 36 may include one or more structural connections between forward walls 52 and aft wall 54 and such structural connections may extend through such cutouts 56. Alternatively or in addition, in embodiments without cutouts 56, structural connection(s) between forward walls 52 and aft wall 54 may extend radially inwardly of one or both flanges 44, 46.

FIG. 4 is a perspective view of carrier 36 of unbalancing weight 20 shown in isolation. Carrier 36 may be manufactured from a suitable metallic material (e.g., steel) using one or more material removal processes such as machining (e.g., milling) and drilling for example. Aft wall 54 may be axially offset from forward wall 52 in the aft direction. Carrier 36 may include shoulder 58, which may be disposed on a radially-outer side of carrier 36 and which may depend radially outwardly from aft wall 54. Shoulder 58 may be engaged (e.g., be in direct or indirect contact) with retainer 60 (shown in FIGS. 3 and 7) of nose cone 30 and/or of hub 26 to cooperatively define a radial load path LP (shown in FIG. 7) between carrier 36 and nose cone 30 and/or hub 26. Shoulder 58 may define a radially outer surface for engagement with retainer 60. In some embodiments, the radially outer surface of shoulder 58 may extend continuously along an entirety of shoulder 58. In some embodiments, shoulder 58 may be angularly disposed between two first holes 48. In some embodiments, shoulder 58 may have an angular span that is greater than half of an angular span of carrier 36 as shown in FIG. 3. For example, a contact surface of shoulder 58 for engagement with retainer 60 may span at least a majority of an angular span of carrier 36 and also of unbalancing weight 20 around rotation axis RA. In other words, radial load path LP shown in FIG. 7 may include an interface between shoulder 58 and retainer 60 that spans at least a majority of an angular span of carrier 36. Shoulder 58 may have an angular span that is less than the angular span of carrier 36. Shoulder 58 may have an angular span that is less than an angular spacing of first holes 48.

FIGS. 5A-5C are axial end-on views of different exemplary configurations 20A-20D of unbalancing weight 20 installed on fan 12 taken along rotation axis RA in the aft direction. The different exemplary configurations 20A-20D of unbalancing weight 20 provide different masses of unbalancing weight 20 for unbalancing fan 12. In some embodiments, carrier 36 may include seven second holes 38 extending axially therethrough. In configuration 20A of FIG. 5A, no additional weight(s) may be mounted to carrier 36 so that all of second holes 38 may be unused. In configuration 20B of FIG. 5B, additional weight may be mounted to carrier 36 in the form of two bolts 40 and two cooperating nuts 42 (shown in FIG. 3) so that two of second holes 38 are occupied and the remainder of second holes 38 are unused. In configuration 20C of FIG. 5C, additional weight may be mounted to carrier 36 in the form of four bolts 40 and four corresponding nuts 42 so that four of second holes 38 are occupied and the remainder of second holes 38 are unused. In configuration 20D of FIG. 5D, additional weight may be mounted to carrier 36 in the form of six bolts 40 and six corresponding nuts 42 so that six of second holes 38 are occupied and the remaining second hole 38 is unused.

FIG. 6 is a cross-sectional view of part of fan 12 taken along line 6-6 extending through one of fasteners 34 in FIG. 5B. The arrangement of the other fastener 34 may be similar or identical to that shown in FIG. 6. Fastener 34 may extend through flange 44 of nose cone 30 and flange 46 of hub 26. Fastener 34 may also extend through first hole 48 formed through forward wall 52 of carrier 36. Fastener 34 and corresponding nut 35 threaded onto fastener 34 may secure (i.e., clamp) flange 44 of nose cone 30 and flange 46 of hub 26 together.

Sleeve 50 may be disposed on a forward side of flange 44 of nose cone 30. Sleeve 50 may be partially inserted into first hole 48 so that sleeve 50 may be clamped between nut 35 and flange 44 of nose cone 30. Fastener 34 may extend through sleeve 50. First hole 48, sleeve 50 and fastener 34 may be sized so that a radial clearance (e.g., gap 62) may be defined between the one or more fasteners 34 and carrier 36 to permit radial positional adjustment of carrier 36 relative to the one or more fasteners 34. Gap 62 may also permit radial positional adjustment of carrier 36 relative to nose cone 30 and/or hub 26. Gap 62 may permit a radially floating connection between carrier 36 and nose cone 30 and/or hub 26. In other words, gap 62 may permit radial movement of carrier 36 relative to fasteners 34 withing a range defined at least in part by gap 62.

Sleeve 50 may have flange 64 extending radially outwardly from a main body of sleeve 50. Flange 64 may be positioned to a forward side of forward wall 52 of carrier 36. An outer diameter of flange 64 may be larger than a diameter of first hole 48. In some embodiments, sleeve 50 may be dimensioned so that flange 64 clamps forward wall 52 of carrier 36 against flange 44 of nose cone 30 when nut 35 is torqued on fastener 34. In other words, part of forward wall 52 may be clamped between flange 64 of sleeve 50 and flange 44 of nose cone 30. Flange 64 of sleeve 50 and flange 44 of nose cone 30 may constrain axial movement of carrier 36 relative to nose cone 30 and/or hub 26.

As shown in FIG. 6, one or more portions of carrier 36 may cradle flange 44 of nose cone 30 so that forward wall 52 of carrier 36 may be disposed on a forward side of flange 44 and aft wall 54 of carrier 36 may be disposed on an aft side of flange 44.

Figure 7:
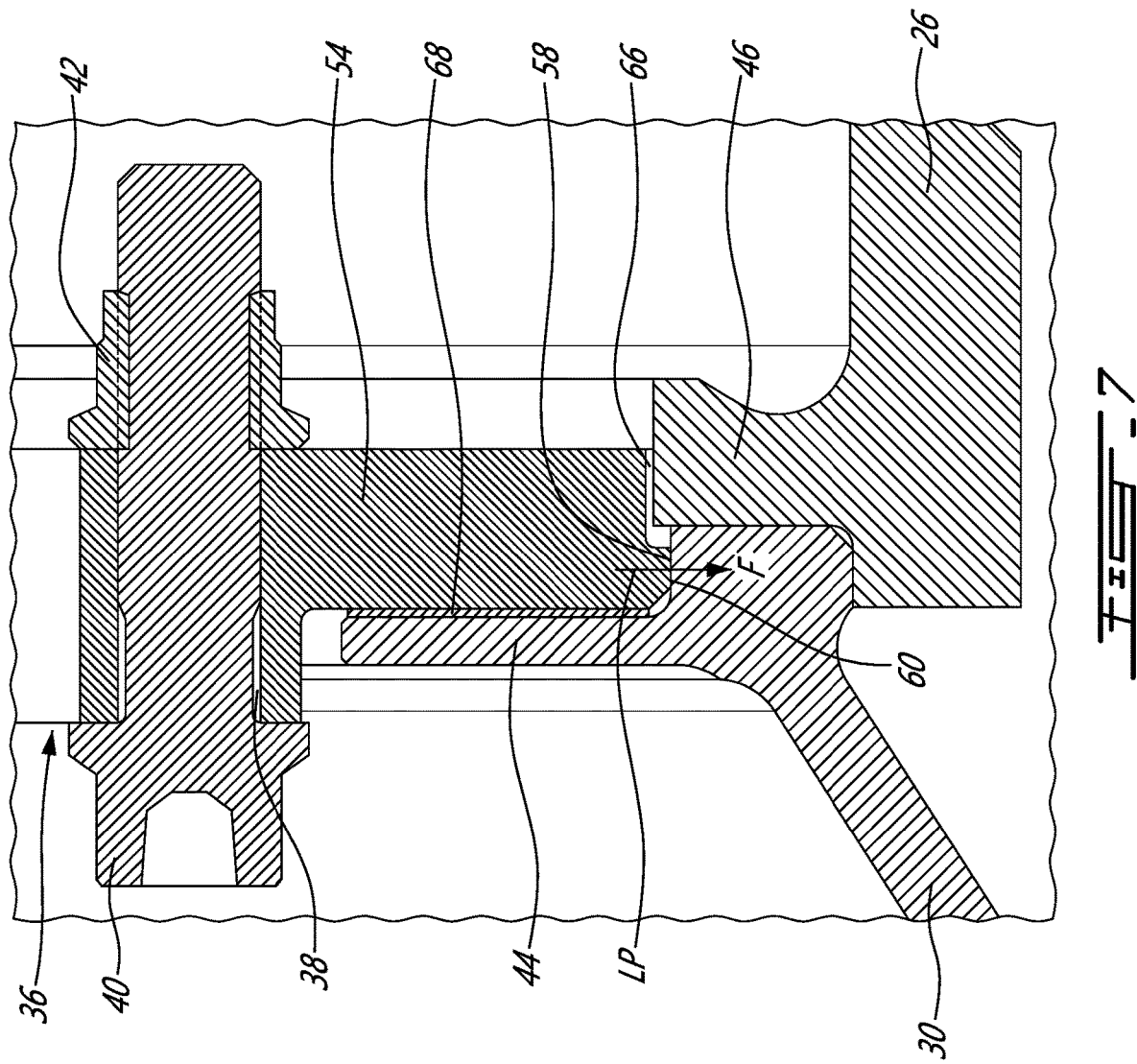
FIG. 7 is a cross-sectional view of the unbalanced rotor taken along line 7-7 in FIG. 5B.

FIG. 7 is a cross-sectional view of part of fan 12 taken along line 7-7 and extending through bolt 40 in FIG. 5B and also through shoulder 58. FIG. 7 shows (e.g., radial) load path LP defined at an interface between shoulder 58 of carrier 36 and retainer 60 of nose cone 30. Load path LP may permit the transfer of centrifugal force F induced by unbalancing weight 20 to nose cone 30 without passing through fasteners 34. In some embodiments, load path LP may be devoid of any fasteners. In some embodiments, load path LP may be devoid of any of fasteners 34. Accordingly, the use of load path LP may avoid a significant load increase on existing fasteners 34. In some embodiments, it may be preferable to have load path LP transfer force F to nose cone 30 instead of to hub 26 since nose cone 30 may be less expensive to replace in case of damage caused to nose cone 30 by unbalancing weight 20. Accordingly, retainer 60 that is engaged with shoulder 58 may be disposed entirely on nose cone 30 so that hub 26 may be devoid of retainer 60. However, in some embodiments, a load path may be established from unbalancing weight 20 to hub 26 using a different retainer instead of or in addition to load path LP.

Retainer 60 may be formed on nose cone 30 and may be disposed radially outwardly of shoulder 58 of carrier 36. In other words, a portion of carrier 36 such as shoulder 58 may be disposed radially inwardly of retainer 60. Retainer 60 may include a radially inner surface of nose cone 30 preventing radially outward movement of carrier 36 during rotation of fan 12. Shoulder 58 may be engaged retainer 60 to define load path LP extending radially outwardly between unbalancing weight 20 and nose cone 30 via retainer 60. In some embodiments, shoulder 58 and retainer 60 may be in direct contact with each other so that retainer 60 radially supports carrier 36. Shoulder 58 and retainer 60 may define a (e.g., contact) interface between unbalancing weight 20 and nose cone 30. Centrifugal force F associated with unbalancing weight 20 may be transferred directly to retainer 60. In some embodiments, an intermediate component may be disposed between shoulder 58 and retainer 60 and may be part of load path LP.

During installation of unbalancing weight 20 onto fan 12, fasteners 34 may be loosened and removed from nuts 42 in order to install sleeves 50 and carrier 36 on flange 44 of nose cone 30. Fasteners 34 may inserted into sleeves 50 and first holes 48, and through flange 44 of nose cone 30 and flange 46 of hub 26. Gap 62 (shown in FIG. 6) between carrier 36 and sleeve 50, and gap 66 (shown in FIG. 7) between carrier 36 and hub 26 may allow for radial positional adjustment of carrier 36 relative to fasteners 34 and nose cone 30 in order to ensure that shoulder 58 can be engaged (e.g., in contact) with retainer 60. For example, gaps 62, 66 may be selected to provide a floating arrangement that accommodates potential dimensional tolerance stack-up that may affect the relative positioning of the components that are assembled together in FIG. 7. Once carrier 36 is positioned so that shoulder 58 is in contact with retainer 60, fasteners 34 and nuts 42 may be torqued to desired specifications to secure flanges 44, 46 together and also secure carrier 36 in place as well.

In some embodiments, optional gasket 68 may be used to protect one or more contact surfaces between unbalancing weight 20 and other components of fan 12. For example, gasket 68 may be disposed between carrier 36 and flange 44 of nose cone 30. In some embodiments, gasket 68 may be made from a silicon rubber that cures at room temperature such as a suitable room-temperature-vulcanizing (RTV) silicone gasket maker for example.

FIG. 8 is a perspective view of another exemplary carrier 136 of another unbalancing weight 120 shown in isolation. Carrier 136 may include elements of carrier 36 previously described above. Like elements are identified using reference numerals that have been incremented by 100. Carrier 136 may include forward walls 152, aft wall 154 and shoulder 158 extending radially outwardly from aft wall 154. First holes 148 may be formed through forward walls 152. Carrier 136 may be installed in the same way as carrier 36 and may include second holes 138 for selectively mounting additional weights to carrier 136. Shoulder 158 of carrier 136 may also engage with retainer 60 of nose cone 30 in the same way as shoulder 58 of carrier 36 to define (e.g., radial) load path LP.

In comparison with carrier 36, carrier 136 may include fewer second holes 138 than does carrier 36. Also, second holes 138 of carrier 136 may be disposed more radially outwardly than second holes 38 of carrier 36. For example, second holes 138 may be formed in aft wall 154 and may be in alignment with cutouts 56 in flange 44 of nose cone 30 so that bolts 40 may extend through cutouts 56.

FIGS. 9A and 9B are axial end-on views of different exemplary configurations 120A and 120B of unbalancing weight 120 installed on fan 12 taken along rotation axis RA in the aft direction. The different exemplary configurations 120A and 120B of unbalancing weight 120 provide different masses of unbalancing weight 120 for unbalancing fan 12. In some embodiments, carrier 136 may include two second holes 138 extending axially therethrough. In configuration 120A of FIG. 9A, no additional weight(s) may be mounted to carrier 136 so that both second holes 138 may be unused. In configuration 120B of FIG. 9B, additional weight may be mounted to carrier 36 in the form of two bolts 40 and two cooperating nuts 42 (shown in FIG. 3) so that both second holes 38 are occupied.

Figure 10:
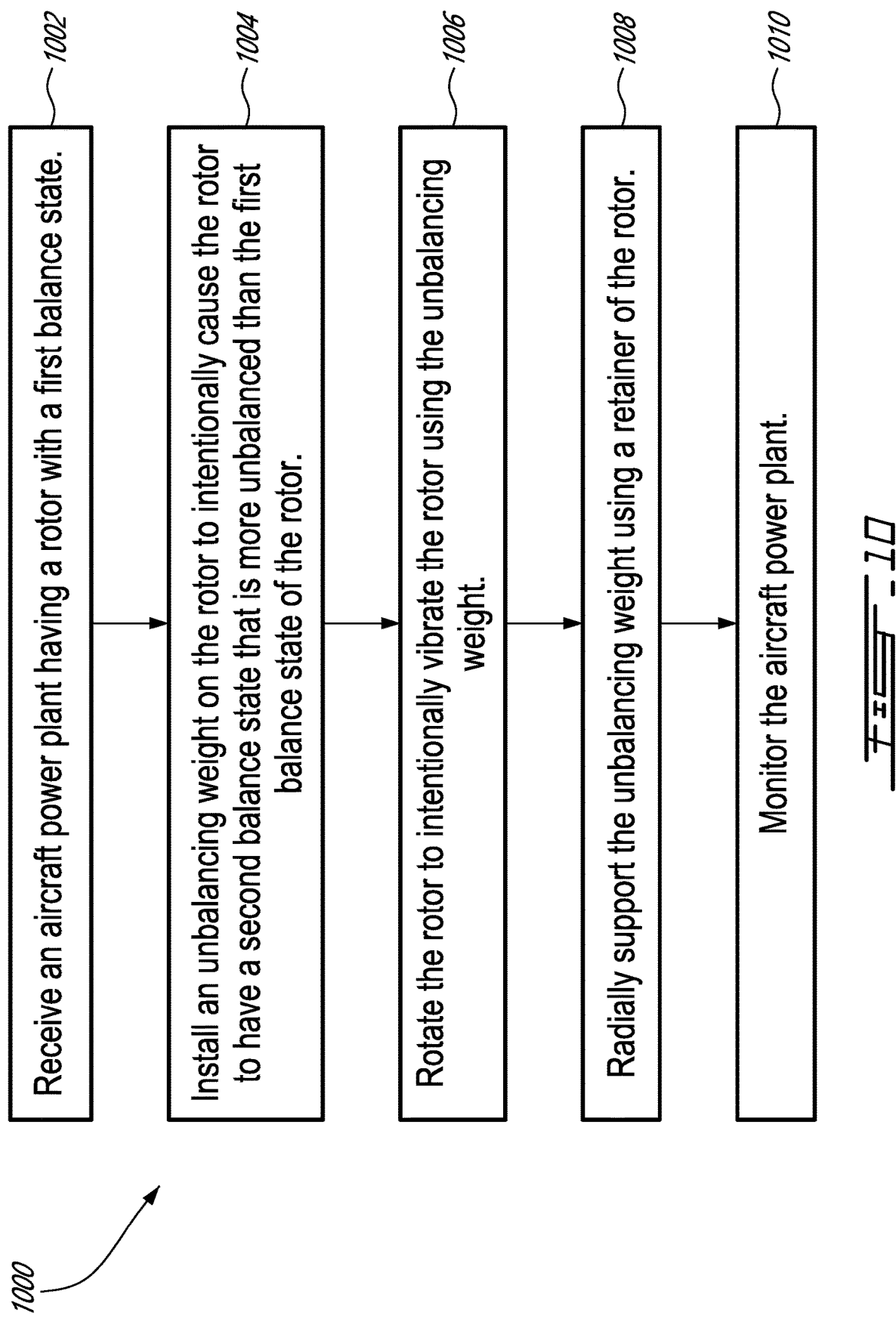
FIG. 10 is a flow diagram of a method of performing an unbalance test on an aircraft engine.

FIG. 10 is a flow diagram of a method 1000 of performing an unbalance test on aircraft power plant 10 or on another aircraft power plant. Method 100 may be performed using fan 12 and unbalancing weight 20 or 120. Elements of unbalancing weight 20 or 120, fan 12 and/or of power plant 10 may be incorporated into method 1000. In various embodiments, method 1000 may include:

- receiving aircraft power plant 10 having a rotor such as fan 12 with a first balance state (block 1002);
- installing unbalancing weight 20, 120 on fan 12 to intentionally cause fan 12 to have a second balance state that is more unbalanced than the first balance state of fan 12 (block 1004);
- rotating fan 12 to intentionally vibrate fan 12 using unbalancing weight 20, 120 (block 1006);
- while fan 12 is being rotated, radially supporting unbalancing weight 20, 120 using retainer 60 of fan 12 (block 1008), and monitoring aircraft power plant 10 (block 1010).

In some embodiments, retainer 60 may be disposed radially outwardly of unbalancing weight 20, 120 and may be engaged with unbalancing weight 20, 120.

Unbalancing weight 20, 120 may be installed on fan 12 using one or more fasteners 34. Retainer 60 may excludes fasteners 34. Method 1000 may include supporting at least a majority of a radially outward load (e.g., centrifugal force F) imposed by unbalancing weight 20, 120 using retainer 60.

In some embodiments of method 1000, power plant 10 may be a turbofan gas turbine engine and fan 12 may be a fan of the turbofan gas turbine engine. Fan 12 may include a plurality of blades 28 extending radially outwardly from hub 26, and nose cone 30 fastened to a forward side of hub 26. Retainer 60 may be part of nose cone 30.

Monitoring of aircraft power plant 10 may be performed visually or manually by maintenance personnel and/or using data acquisition equipment 22 and sensor(s) 24 shown in FIG. 1.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. An unbalanced rotor of an aircraft power plant, the unbalanced rotor comprising:
   a hollow body rotatable about a rotation axis, an interior of the hollow body including a retainer; and
   an unbalancing weight installed inside of the hollow body to intentionally vibrate the rotor during rotation of the rotor, the unbalancing weight being fastened to the hollow body, a portion of the unbalancing weight being disposed radially inwardly of the retainer of the hollow body and being engaged with the retainer to define a radial load path between the unbalancing weight and the hollow body via the retainer, the radial load path excluding any of one or more fasteners fastening the unbalancing weight to the hollow body, the unbalancing weight having an angular span extending only partially around the rotation axis.

2. The unbalanced rotor as defined in claim 1, wherein:
   the hollow body includes a hub and a nose cone fastened to the hub;
   the unbalanced rotor includes a plurality of blades extending radially outwardly from the hub; and
   the one or more fasteners secure the nose cone to the hub.

3. The unbalanced rotor as defined in claim 2, wherein the retainer is part of the nose cone.

4. The unbalanced rotor as defined in claim 3, wherein the hub is devoid of the retainer.

5. The unbalanced rotor as defined in claim 2, wherein:
   the unbalancing weight includes one or more holes receiving the one or more fasteners respectively therethrough;
   the one or more fasteners extend through a flange of the hub and a flange of the nose cone; and
   the one or more fasteners secure the flange of the hub with the flange of the nose cone together.

6. The unbalanced rotor as defined in claim 5, wherein:
   the nose cone is disposed axially forward of the hub;
   the unbalancing weight includes:
      a forward wall disposed axially forward of the flange of the nose cone; and
      an aft wall connected to the forward wall and disposed axially aft of the flange of the nose cone.

7. The unbalanced rotor as defined in claim 6, wherein the forward wall and the aft wall of the unbalancing weight are connected together via a cutout through the flange of the nose cone.

8. The unbalanced rotor as defined in claim 5, comprising one or more sleeves disposed inside the one or more holes respectively, wherein:
   the one or more fasteners extend through the one or more sleeves respectively; and
   the one or more holes in the unbalancing weight and the one or more sleeves are sized to define clearances between the one or more sleeves and the one or more holes respectively.

9. The unbalanced rotor as defined in claim 1, wherein the unbalancing weight includes:
   one or more first holes receiving the one or more fasteners respectively therethrough; and
   one or more second holes for mounting additional weight to the unbalancing weight.

10. The unbalanced rotor as defined in claim 9, wherein the additional weight includes one or more bolts extending through the one or more second holes respectively.

11. The unbalanced rotor as defined in claim 9, wherein:
   the one or more first holes include two angularly spaced apart first holes; and
   the one or more second holes are angularly disposed between the two angularly spaced apart first holes.

12. The unbalanced rotor as defined in claim 1, wherein:
   the radial load path includes an interface between a shoulder of a carrier of the unbalancing weight and the retainer;
   an angular span of the shoulder around the rotation axis is greater than half of an angular span of the carrier of the unbalancing weight around the rotation axis; and
   the angular span of the shoulder is less than the angular span of the carrier.

13. The unbalanced rotor as defined in claim 1, wherein a gasket is disposed between the unbalancing weight and the hollow body.

14. An aircraft power plant comprising:
   a bladed rotor including a hub, the bladed rotor being rotatable about a rotation axis;
   a nose cone fastened to the hub of the bladed rotor, the nose cone and the hub cooperatively defining an internal cavity; and
   an unbalancing weight installed inside the internal cavity to intentionally vibrate the bladed rotor during rotation of the bladed rotor, the unbalancing weight including:
      a carrier engaged with a radially inner surface of the nose cone so that the radially inner surface of the nose cone prevents radially outer movement of the carrier during rotation of the bladed rotor, the carrier having an angular span extending only partially around the rotation axis; and
      one or more additional weights mounted to the carrier.

15. The aircraft power plant as defined in claim 14, wherein:
   a radial load path is defined between the carrier and the nose cone via the radially inner surface of the nose cone; and
   the radial load path is devoid of any fasteners.

16. The aircraft power plant as defined in claim 14, wherein:
   the unbalancing weight is installed inside the internal cavity via one or more fasteners extending through the carrier; and a radial clearance is defined between the one or more fasteners and the carrier to permit radial positional adjustment of the carrier relative to the one or more fasteners.

17. The aircraft power plant as defined in claim 14, wherein:
a flange of the hub is fastened to a flange of the nose cone;
the carrier includes:
   a forward wall disposed axially forward of the flange of the nose cone; and
   an aft wall disposed axially aft of the flange of the nose cone; and
the forward wall and the aft wall are connected together via a cutout through the flange of the nose cone.

18. A method of performing an unbalance test on an aircraft power plant, the method comprising:
receiving an aircraft power plant having a rotor with a first balance state;
installing an unbalancing weight on the rotor to intentionally cause the rotor to have a second balance state that is more unbalanced than the first balance state of the rotor, the unbalancing weight having an angular span extending only partially around a rotation axis of the rotor;
rotating the rotor to intentionally vibrate the rotor using the unbalancing weight;
while the rotor is being rotated:
   radially supporting the unbalancing weight using a retainer of the rotor, the retainer being disposed radially outwardly of a portion of the unbalancing weight and being engaged with the portion of the unbalancing weight; and
   monitoring the aircraft power plant.

19. The method as defined in claim 18, wherein:
the unbalancing weight is installed on the rotor using one or more fasteners;
the retainer excludes the one or more fasteners; and
the method includes supporting a radially outward load imposed by the unbalancing weight using the retainer.

20. The method as defined in claim 19, wherein:
the aircraft power plant is a turbofan gas turbine engine;
the rotor is a fan of the turbofan gas turbine engine;
the fan includes: a plurality of blades extending radially outwardly from a hub; and a nose cone fastened to a forward side of the hub; and
the retainer is part of the nose cone.

\* \* \* \* \*